United States Patent Office 3,343,963
Patented Sept. 26, 1967

3,343,963
IMPREGNATING EDIBLE PROTEIN FIBERS WITH THREE COMPONENT BINDER AND PRODUCT
Niles A. Kjelson, Minneapolis, Minn., assignor to General Mills, Inc., a corporation of Delaware
No Drawing. Filed Mar. 12, 1965, Ser. No. 439,460
16 Claims. (Cl. 99—14)

The present invention relates to high protein food products and the process of preparing same. More particularly, it relates to such products prepared from edible protein fibers and a binder material consisting essentially of albumen, gluten and particulate defatted oilseed material.

This application is a continuation in part of my prior application Ser. No. 203,447, filed June 19, 1962.

Simulated food products, especially meat substitutes, have recently been prepared from fibers derived from edible protein materials. These protein fibers are prepared by the creation of a spinning dope of protein which is then forced through a porous membrane such as a spinneret to form fibers or filaments which are coagulated in an acid salt bath and oriented by suitable means, such as a series of rolls revolving at increasing speeds. The filaments are then placed in a salt solution (such as sodium chloride) of sufficient concentration to prevent the filaments from redissolving. Groups of these filaments are freed from excess liquid by squeezing or centrifuging and impregnated with flavoring agents, coloring agents, oils, fats and binder materials. The impregnated filaments are then allowed to set-up by heating. The flavoring agents and the like can be so selected and the fiber bundles so arranged as to simulate the meat of mammals, fish, fowl, and shell fish.

Many natural food products can theoretically be simulated using the above techniques. However, in order to enjoy much commercial success, such products must closely resemble the natural foods as to texture, flavor and appearance. In addition, the simulated products must be able to compete favorably as to price. Prior to the present invention, the only material enjoying much success as a binder in the preparation of the heat set-up products was albumen. While certain products can be closely simulated using such binder, others cannot. Thus, it has been found that ground meats, such as chopped beef, ham and the like can be prepared from spun protein fibers and albumen as the sole binder material but that such products, when dried and rehydrated, differ significantly from the natural meats which they are to simulate, in that they are fairly mealy and more loose textured than the natural meats. Additionally, albumen is fairly expensive and is used in amounts which materially affect the cost of the simulated food products. It would be highly desirable to be able to replace a substantial portion of the albumen with less expensive materials and, at the same time, produce simulated food products of excellent texture and/or appearance, such properties being retained even after dehydration and rehydration.

Therefore, it is an object of the invention to provide novel simulated food products.

Another object of the invention is to provide a method for preparing such products.

These and other objects will become apparent from the following detailed description.

I have now discovered that simulated food products having excellent texture and/or appearance can be prepared from spun edible protein fibers and a binder consisting essentially of a mixture of albumen, gluten and particulate defatted oilseed material. My process generally comprises the steps of impregnating spun edible protein fibers with a composition containing a binder consisting essentially of a mixture of albumen, gluten and particulate defatted oilseed material and allowing the impregnated filaments to set-up by applying heat thereto. After the setting-up step, the simulated food products can be cut into various size pieces, chopped or ground, fried, smoked and/or dried as will be more fully described hereinbelow. My invention is particularly designed for the production of products which can be chopped or ground, the chopped or ground products closely resembling natural foods such as hamburger, ground ham and the like even after dehydration and rehydration. It is understood that the impregnated spun protein fibers can be simultaneously set-up and chopped or ground as well as first set-up and then chopped or ground.

The spun protein filaments of fibers used in my process can be produced by any of the methods known in the art. Thus, a wide variety of protein materials which are edible can be used in preparing the dispersions. Representative of such materials are soybean, safflower, corn, peanut and pea proteins as well as various animal proteins such as casein. The edible protein is dispersed in an alkaline medium in varying amounts, such as from about 10–30% by weight. A suitable alkaline medium is water containing an alkali metal hydroxide, i.e., about 5–10% by weight NaOH. The pH of the spinning solution can vary within relatively wide limits but is generally in the range of 9 to 13.5. The viscosity and temperature of such dispersions will generally be within the range of about 10,000–20,000 centipoises and about 20–45° C., respectively. Obviously, the viscosity, pH, temperature and concentrations of alkali metal hydroxide and protein will vary somewhat with the particular protein being dispersed. Also, the dispersions may amount to a colloidal solution, and it is understood that the use of either dispersion or colloidal solution in the claims is inclusive of the other.

After formation of the dispersion or spinning dope, it is forced through a porous membrance, such as a spinneret used in the production of rayon, into a coagulating bath which is generally an acid salt solution. The streamlets coming through the spinneret are thus precipitated in the form of filaments. The filaments issuing from the spinneret, which is actually a small die having from perhaps 5,000 to 15,000 holes each on the order of 0.003–0.004 inch in diameter, will be of a diameter of about 0.003–0.004 inch. Alternatively, coarser filaments can be produced by starting with the protein in the form of powdered material and plasticizing them with about 25% alkaline water and then extruding the plasticized protein material through dies. Filaments produced by such a process may be of much greater thickness on the order of paint brush bristles. It is also possible to have a series of spinnerets producing filaments from the protein dispersion. Such spinnerets may have the same or different number of holes making it possible to directly produce tows of filaments having the same or different diameters.

The coagulating bath is preferably an aqueous solution of salt and an acid. The salt (i.e., NaCl, for example) can be used in widely varying concentrations, such as from about 0.5 to 12% by weight. The acid can be any of those normally used in the coagulating bath. Representative acidic compounds are acetic acid, lactic acid, citric acid, adipic acid, hydrochloric acid, phosphoric and the like. The concentration of said acid in the bath is not critical and may vary between about 0.5 to 10% by weight.

The filaments or bundles thereof (tows) are stretched by pulling them from the coagulating bath over a takeaway reel. Preferably, stretching tensions of 50–400% are applied to the filaments or fibers. It is understood, however, that higher or lower tensions can be used and also that the stretching can be performed on a series of reels each with an increasing rate of speed or an increased stretching tension. It is further understood that the stretching of the filaments or fibers can take place in a coagulating bath, after emergence thereof from said bath, or partly in the bath and partly after emergence from the bath. The stretching orients the molecules of the filaments or fibers.

The pH of the filaments or bundles thereof leaving the coagulating bath is generally in the range of about 1.0–4.5 which, in the lower pH area of said range, is undesirable since food products prepared therefrom have a sour taste and are normally too dry and tough. Thus, said filaments are conventionally neutralized by passing them through a neutralizing bath which is normally a salt (NaCl) solution containing an alkali metal hyroxide or bicarbonate. When needed, the neutralization is preferably carried out until the pH of the fibers is in the range of about 3.5 to 6.5 which is the pH of most natural meats. However, the pH may generally be in the range of about 3.5 to about 7.0, if desired. The neutralization may also be accomplished by alkaline agents other than the alkali metal hydroxides such as alkaline salts. The pH of the fibers can also be raised to the desired range by water washing and the washing solutions may contain salt. However, such procedure may require more handling time and somewhat more processing steps.

After the neutralization step, the filaments are freed from excess neutralizing solution and then according to my invention are impregnated with a composition containing a binder consisting essentially of a mixture of albumen, gluten and particularly defatted oilseed material. The albumen is preferably derived from fresh eggs or dried egg white.

The gluten used as part of the binder in the preparation of the food products of my invention is preferably wheat gluten. The preferred wheat gluten may be freshly prepared or may be in dehydrated form. Such dried gluten is preferably reconstituted with water to about 50 to 75% $H_2O$ by weight.

The particulate defatted oilseed material, such as flour or meal, is derived from oilseeds such as soybeans, peanuts, castor beans, safflower seeds, and the like, Said particulate material is preferably prepared from soybeans. The beans are first broken down to form flakes (hulls and the like are removed). The oil is then extracted from the flakes by any suitable means such as with a petroleum solvent and/or an alcohol. A particularly suitable petroleum solvent is hexane. Representative alcohols are ethanol and isopropanol. Aqueous solutions of said alcohols may also be used with the azeotropic solutions being preferred. The solutions are mixed with the oilseed flakes and agitated for a sufficient length of time to remove substantially all of the oil therefrom. It is also possible to first extract the flakes with hexane, for example, followed by extraction thereof with alcohol. The alcohols have a tendency to remove most or all of the bitter ingredients of the oilseed flakes. After extraction, the petroleum solvent and/or alcohol is removed by vapor desolventizing. Thus, hexane-wet flakes, for example, can be subjected to a continuous stream of superheated hexane vapors in a closed system. It is understood, that other desolventizing means can be used such as vacuum, warm air drying and the like. In fact, any of the known methods of extracting oils from the oilseed flakes can be used. The substantially solvent- and oil-free flakes are then preferably toasted by heating at elevated temperatures of about 100–150° C. for a few minutes to an hour or more. Such toasting decreases the solubility of the protein in the particulate material. Additionally, the flakes are preferably reduced in size to a fairly uniform flour having particles which will pass a 100 to 300 mesh screen.

The spun protein fibers preferably contain about 50 to 80% water by weight prior to the impregnation thereof. It is especially preferred that the fibers contain about 60 to 70% by weight water prior to the said impregnation. The binder is used in an amount sufficient to provide a food product having the fibers bound together to the desired extent after the heat-setting step. The amount of binder will of necessity vary somewhat depending upon the particular food or meat product being simulated. Preferably the ratio (dry basis) of binder to fiber will be in the range of about 2:1 to 1:4. A particularly preferred ratio is about 1:1 by weight.

The amounts of albumen, gluten and particulate defatted oilseed material in the binder can also vary considerably, it being only necessary that the gluten and particulate defatted oilseed material be present in amounts sufficient to provide a product having excellent texture and/or appearance even after dehydration and rehydration. Preferably, the ratio (dry basis) of gluten to albumen will be about 0.25:1 to 5.0:1. The ratio (dry basis) of particulate defatted oilseed material to albumen is also preferably about 0.25:1 to 5.0:1. Particularly preferred ratios of gluten and defatted oilseed material to albumen are 0.5:1 to 1.5:1. It is also understood that when dehydrated albumen and/or gluten are used enough water will be added thereto or during the impregnation step to rehydrate same.

The composition used to impregnate the fibers may contain, in addition to the above-described binder, water and other materials such as flavoring agents, coloring agents, oils and fats and the like. Various meat flavors which are available commercially can be added. Representative thereof are bouillon cubes having chicken, beef and other meat flavors. Synthetic ham, bacon and sausage flavors may also be used. Additionally, various spices and salts can be employed to further flavor the fibers. The coloring agents may be dyes or other materials.

Vegetable oils and animal fats and oils can also be added to the fibers. Representative thereof are soybean oil, cottonseed oil, corn oil, coconut oil, palm kernel oil, olive oil, peanut oil, sesame seed oil, safflower oil, tallow, lard, chicken fat, butter, cod-liver oil and the like. The said oils and fats may be partially or fully hydrogenated.

The binder, flavoring agents, oils and fats can be added to the fibers separately. Thus, the fibers can first be passed through a bath containing the binder and, preferably also, the flavoring agents. The fibers can then be passed through a bath of the oil or melted fat. It is understood that the individual fibers or bundles thereof of different sizes can be treated with the above-described agents. The fibers or bundles thereof can also be cut into desired lengths, such as one to two inches, prior to the impregnation. The binder and other addition agents are preferably applied to the fibers in a single operation. Thus, the various ingredients of the impregnating composition can be emulsified and the fibers passed through said emulsion to provide an even distribution of the binder, fat and flavoring agents in the simulated meat product. An edible emulsifier can be used to prepare the additive emulsion. Representative of such emulsifiers are: mono- and diglycerides of fatty acids, such as monostearin, monopalmitin, monoolein, and dipalmitin; higher fatty acid esters of sugars, such as sucrose partial palmitate and sucrose partial oleate; phosphoric and sulfuric acid esters, such as dodecyl glyceryl ether sulfates and monostearin phosphate; partial esters of glycerol and both higher and lower fatty acids, such as glyceryl lactopalmitate; and polyoxyalkylene ethers of fatty esters of polyhydric alcohols, such as the polyoxyethylene ethers of sorbitan monostearate and sorbitan distearate.

The impregnated fibers are then set-up by heating such as by baking, boiling, broiling and the like. Where a continuous tow of impregnated fibers is to be set-up, such tow can be treated directly with steam. This can be accomplished in a variety of ways. Thus, the fiber tow can be pulled continuously through jets of live steam, or, more efficiently, through a partially enclosed chamber having a steam inlet, such as a steam tower. The tower can be so positioned that the impregnated tow will pass downwardly through the tower directly from the bath. This is advantageous since the impregnated tow may have a tendency to adhere to the sides of the unlubricated steam chamber. Of course, other tower positions can be used. Thus, if enough tension is placed on the fiber tow, it can be passed horizontally through the tower to yield good results. The length of time which the impregnated fiber will be contacted with steam will vary considerably depending upon the particular protein used to prepare the fiber, the thickness of the fiber tow, the particular addition agents and the amounts thereof. Good results are obtained with contact times of a few seconds to about one minute. In any of the described procedures it is only necessary that the heating temperature and time is sufficient to set-up the binder. Temperatures of about 160 to 350° F. are preferred.

The simulated food product, after the described setting-up procedures, can be packaged and sold as such. However, it can be optionally treated in a variety of ways to provide specialized products. Thus, as indicated previously, the process of the present invention is particularly valuable in providing simulated chopped or ground meats which closely resemble their natural counterparts. Thus the impregnated fibers can be simultaneously set-up and chopped or ground or can be chopped or ground subsequent to the setting-up step. The resulting ground product is not only of excellent texture and/or appearance but is less expensive than when albumen is used as the sole binder material. In addition the products can be readily dehydrated which is a highly desirable property since such dehydrated products find use in a variety of packaged dry mixes, such as sauces, casseroles and the like. The dehydration is preferably accomplished at temperatures of about 70–150° F. using tray drying techniques. When rehydrated, such products again display excellent texture and/or appearance.

The following specific examples are furnished for the purpose of illustration only and are not to be construed as placing any limitations on the scope of the present invention.

EXAMPLE I

One hundred grams of an acid-salt protein fiber suspension (50% by weight water) which had been aged for at least about 7 days was added to two liters of an aqueous salt solution (1% NaCl). The initial pH of 3.0–3.5 was raised to a final pH of 5.0–5.5 by the addition of sodium bicarbonate. The fibers (prepared from isolated soybean protein) were then squeezed through rubber rolls and rinsed in a 1% NaCl solution. They were again squeezed or pressed to remove excess liquid. One hundred parts by weight of the fibers (35–40% solids) were then impregnated with 200 parts of an emulsion made up of the following ingredients:

| | Amount (parts by weight) |
|---|---|
| Oil (a lightly hydrogenated mixture of cottonseed and soybean oils) | 50 |
| Glyceryl lactopalmitate | 4 |
| Water (hot) | 160 |
| Mono-sodium glutamate | 3 |
| Yellow-Onion powder | 18 |
| Brown sugar | 7 |
| Red dye (1% aqueous solution) | 6 |
| Dried egg albumen | 10 |
| Toasted, defatted soybean flour (200 mesh) | 20 |
| Fresh gluten (33% solids) | 90 |
| Salt | 25 |
| Water (cold) | 40 |

The emulsion was prepared by first mixing the oil, hot water, glyceryl lactopalmitate, flavoring agents and dye. Then the albumen, soybean flour and gluten suspended in the cold water containing the salt were added thereto with high speed stirring to form a free flowing homogenous emulsion. The impregnated fibers were aligned in a pan, covered and heat-set in an oven at 340° F. for 30 minutes. Good fiber-to-fiber bonding was apparent from the appearance and eating qualities of the set-up tow (beef flavored).

EXAMPLE II

Example I is repeated using no gluten or defatted soybean flour. In order to obtain similar fiber-to-fiber bonding, it is necessary to increase the amount of egg albumen in the emulsion from 10 to 30 parts. This greatly increases the cost of the final simulated meat product. Also, inclusion of the much less expensive gluten and defatted soybean flour increases the volume of the final product, since such materials also act as fillers or extenders in addition to their binding action.

EXAMPLE III

A tow of soy protein fibers (fibers were prepared from isolated soy protein) was cut so that the fibers had lengths of about one to two inches. The fibers had a pH of about 4.5 and the tow of fibers had a moisture content of about 65%. Four hundred fifty-four parts of the cut, wet fibers were impregnated by mixing the same with an impregnating serum consisting of the following ingredients:

| | Amount (parts by weight) |
|---|---|
| Oil (a lightly hydrogenated mixture of cottonseed and soybean oils) | 91 |
| Water | 234 |
| Dried egg albumen | 57.6 |
| Dried wheat gluten | 55.4 |
| Toasted, defatted soybean flour | 44.6 |
| Mono-sodium glutamate | 3.2 |
| Yellow-Onion powder | 32.2 |
| Brown sugar | 23.0 |
| Salt | 5.9 |
| Red dye (1% aqueous solution) | 1.26 |
| Hydrolyzed vegetable protein flavor | 8.06 |
| Caramel and cocoa coloring | 3.02 |

The resulting impregnated fibers were set-up by heating the same at about 165–170° F. for about 30 minutes. The set-up product was then cooled and ground through a 3/8 inch hamburger die. The simulated chopped beef had a firm, cohesive texture which very closely resembled cooked natural chopped beef or hamburger. The product was easily dehydrated to 4% moisture. When rehydrated in boiling water, the dehydrated product had the same excellent properties as was evident in the simulated chopped beef prior to dehydration.

EXAMPLE IV

Example III was repeated except that the binder consisted entirely of 157.6 parts dehydrated egg albumen. While the resulting product resembled cooked natural chopped beef prior to dehydration, it differed significantly in this respect from the product of Example III after being dried and rehydrated. Thus such product was loose textured and fairly mealy. In addition it was more difficult to dehydrate and was more expensive due to the cost of the albumen used therein than the product of Example III.

EXAMPLE V

Example III was repeated except that the binder consisted entirely of 157.6 parts of dried wheat gluten. After dehydration and rehydration, the product was quite mealy and loose textured. It was not elastic and was not similar to cooked natural chopped beef. It also had substantially the same undesirable properties prior to being dehydrated.

EXAMPLE VI

Example III was repeated except that the binder consisted entirely of 157.6 parts of toasted, defatted soybean flour. The resulting product was mushy, having no elastic or firm texture. It did not resemble natural cooked chopped beef. Such undesirable properties were also evident in the product after dehydration and rehydration.

While the present invention is particularly valuable for providing simulated chopped meats which closely resemble their natural counterparts, it is also valuable for providing other simulated meat products. One other such product is simulated chicken. The noted products have excellent texture and/or appearance as well as being less expensive. The excellent texture and/or appearance is unexpectedly retained when the products are dehydrated and then rehydrated.

It is to be understood that the invention is not to be limited to the exact details of operation or the compositions and methods shown and described, as obvious modifications will be apparent to those skilled in the art and the invention is to be limited only by the scope of the appended claims.

Now, therefore, I claim:

1. A process for preparing a fibrous food product comprising: impregnating spun edible protein fibers with a composition containing a binder consisting essentially of albumen, gluten and particulate defatted oilseed material, said binder being used in an amount sufficient to bind the fibers together after application of heat and said gluten and particulate defatted oilseed material being present in the binder in amounts sufficient to provide a heat-set food product having excellent texture and appearance even after dehydration and rehydration; and allowing the impregnated fibers to set-up by applying heat thereto.

2. The process of claim 1 wherein the fibers are spun edible soy protein fibers.

3. The process of claim 1 wherein the fibers contain from about 50 to 80% by weight water.

4. The process of claim 1 wherein the gluten is dried wheat gluten and the particulate defatted oilseed material is defatted soybean flour.

5. The process of claim 1 wherein the impregnating composition also contains at least one agent selected from the group consisting of water, flavoring agents, colorants, oils and fats.

6. The process of claim 1 wherein the set-up fibrous food product is ground.

7. The process of claim 1 wherein the set-up fibrous food product is dried.

8. A process for preparing a fibrous food product comprising: impregnating spun edible protein fibers having a pH of about 3.5 to 7.0 and a moisture content of about 50 to 80% with a composition containing a binder consisting essentially of egg albumen, wheat gluten and defatted soybean flour, the weight ratio of binder to fiber on a dry basis being in the range of about 2:1 to 1:4 and the weight ratio of each of the wheat gluten and defatted soybean flour to the egg albumen on a dry basis being in the range of about 0.25:1 to 5.0:1; and allowing the impregnated fibers to set-up by applying heat thereto.

9. The process of claim 8 wherein the weight ratio of binder to fiber on a dry basis is in the range of about 1:1 and the weight ratio of each of the wheat gluten and defatted soybean flour to the egg albumen on a dry basis is in the range of about 0.5:1 to 1.5:1.

10. The process of claim 9 wherein the impregnating composition also contains at least one agent selected from the group consisting of water, flavoring agents, colorants, oils and fats.

11. The process of claim 10 wherein the impregnated fibers are ground simultaneously with the setting-up thereof.

12. The process of claim 10 wherein the set-up fibrous food product is ground.

13. The fibrous food product produced by the process of claim 1.

14. A process for preparing a fibrous food product comprising: impregnating spun edible protein fibers with a composition containing a binder consisting essentially of albumen, gluten and particulate defatted oilseed material, the weight ratio of binder to fiber on a dry basis being in the range of about 2:1 to 1:4 and the weight ratio of each of the gluten and particulate oilseed material to the albumen in the binder on a dry basis being in the range of about 0.25:1 to 5.0:1; and allowing the impregnated fibers to set-up by applying heat thereto.

15. A process for preparing a fibrous food product comprising: impregnating spun edible protein fibers with a composition containing a binder consisting essentially of albumen, gluten and particulate defatted oilseed material, the weight ratio of binder to fiber on a dry basis being in the range of about 2:1 to 1:4 and the weight ratio of each of the gluten and particulate oilseed material to the albumen in the binder on a dry basis being in the range of about 0.25:1 to 5.0:1; allowing the impregnated fibers to set-up by applying heat thereto; and drying the set-up fibrous food product.

16. A process for preparing a fibrous food product comprising: impregnating spun edible protein fibers having a pH of about 3.5 to 7.0 and a moisture content of about 50 to 80% with a composition containing a binder consisting essentially of egg albumen, wheat gluten and defatted soybean flour, the weight ratio of binder to fiber on a dry basis being in the range of about 2:1 to 1:4 and the weight ratio of each of the wheat gluten and defatted soybean flour to the egg albumen on a dry basis being in the range of about 0.25:1 to 5.0:1; allowing the impregnated fibers to set-up by applying heat thereto; grinding the set-up fibrous food product; and drying the set-up and ground fibrous food product.

References Cited

UNITED STATES PATENTS

| 2,682,466 | 6/1954 | Boyer | 99—14 |
| 2,830,902 | 4/1958 | Anson | 99—14 |

A. LOUIS MONACELL, *Primary Examiner.*

J. M. GOLIAN, *Assistant Examiner.*